March 1, 1932. E. M. HOLMER 1,847,515
MACHINE FOR MAKING BLANKS FOR CARDBOARD BOXES
Filed July 1, 1930 5 Sheets-Sheet 1

Inventor:-
E. M. Holmer

March 1, 1932.  E. M. HOLMER  1,847,515
MACHINE FOR MAKING BLANKS FOR CARDBOARD BOXES
Filed July 1, 1930  5 Sheets-Sheet 2
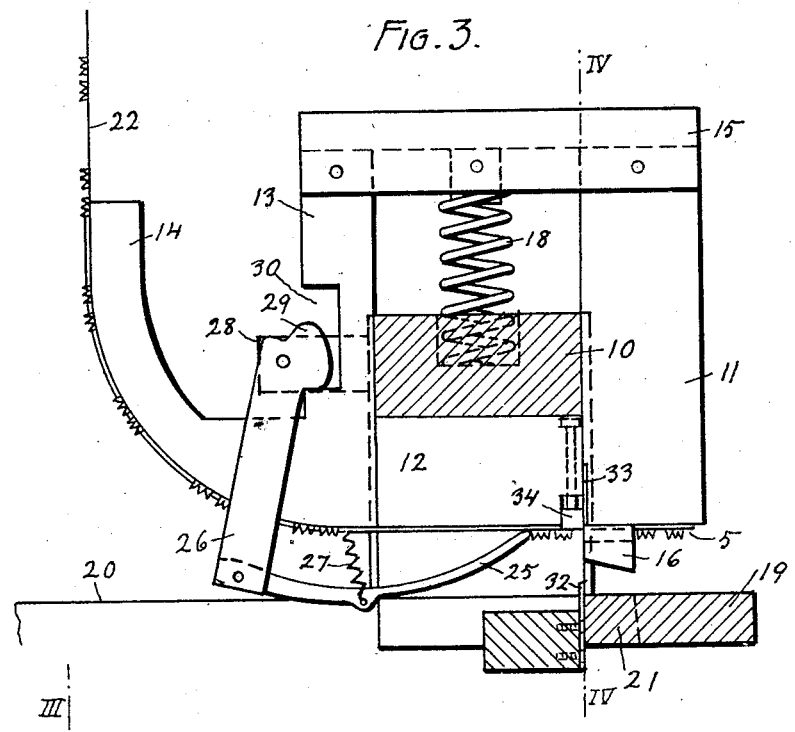
Fig. 3.
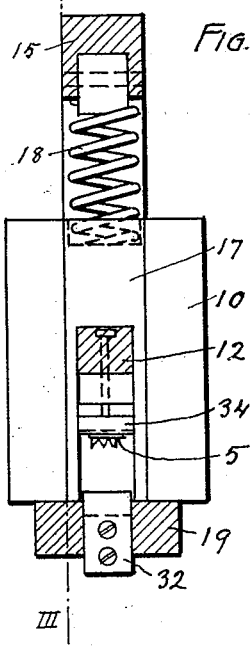
Fig. 4.
Fig. 6.
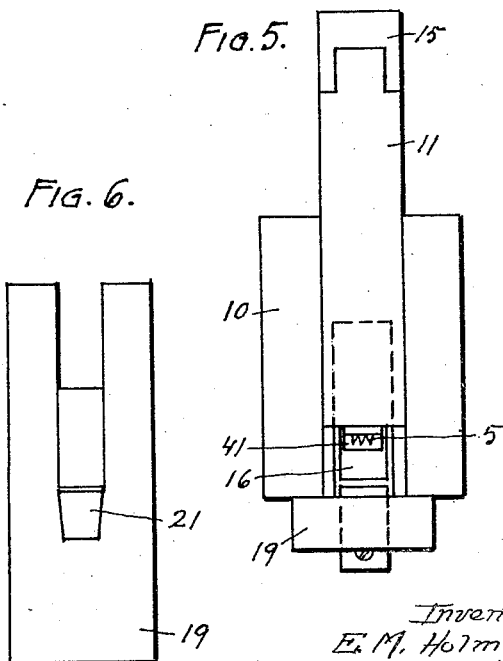
Fig. 5.
Inventor:-
E. M. Holmer March 1, 1932. E. M. HOLMER 1,847,515
MACHINE FOR MAKING BLANKS FOR CARDBOARD BOXES
Filed July 1, 1930 5 Sheets-Sheet 3
Fig. 9.
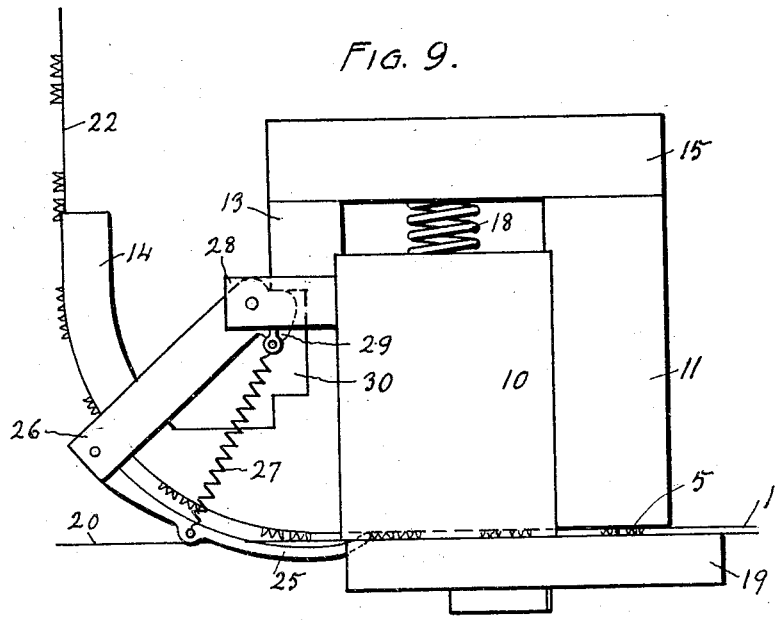
Fig. 7.
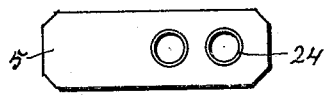
Fig. 8.
Fig. 10.
Fig. 11.
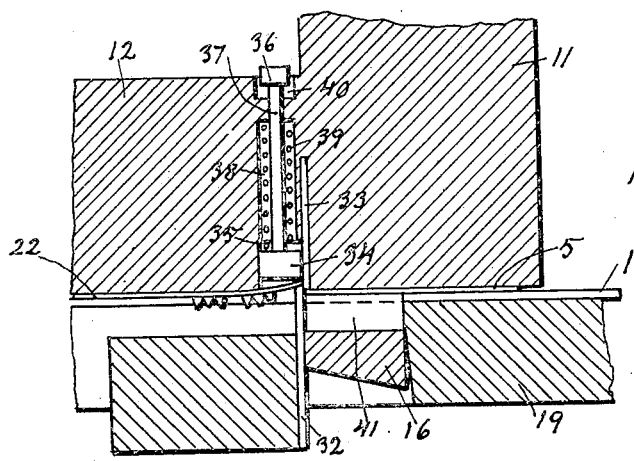
Inventor:-
E. M. Holmer
by
Attys.

March 1, 1932. E. M. HOLMER 1,847,515
MACHINE FOR MAKING BLANKS FOR CARDBOARD BOXES
Filed July 1, 1930 5 Sheets-Sheet 4
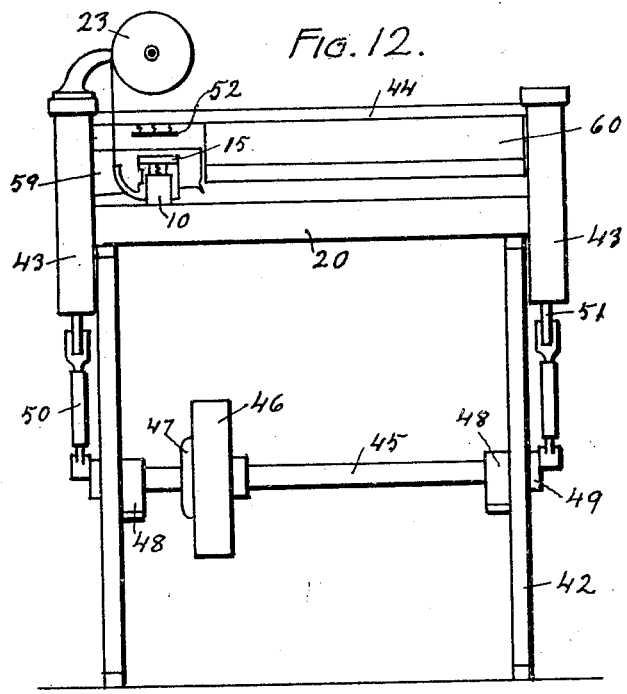
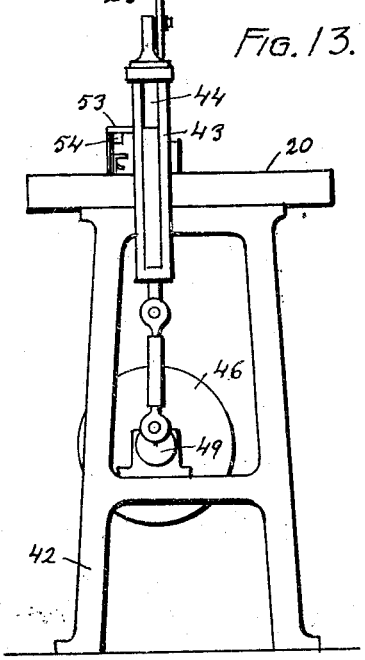
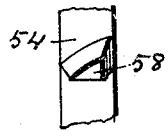
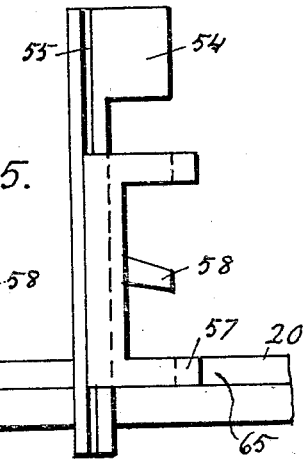
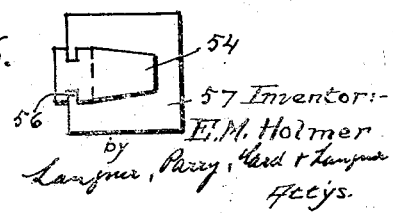

March 1, 1932.  E. M. HOLMER  1,847,515
MACHINE FOR MAKING BLANKS FOR CARDBOARD BOXES
Filed July 1, 1930  5 Sheets-Sheet 5
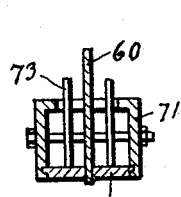
FIG.17.
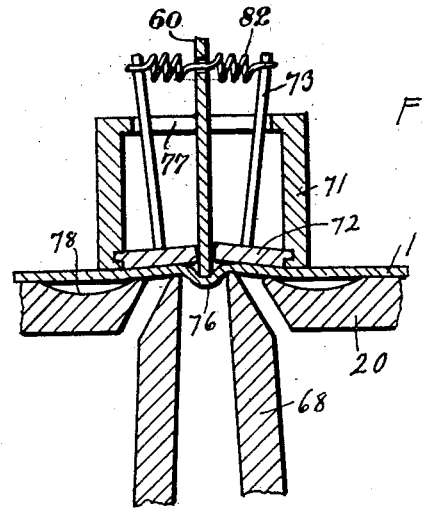
Fig.18.
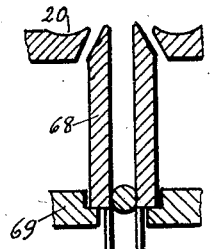
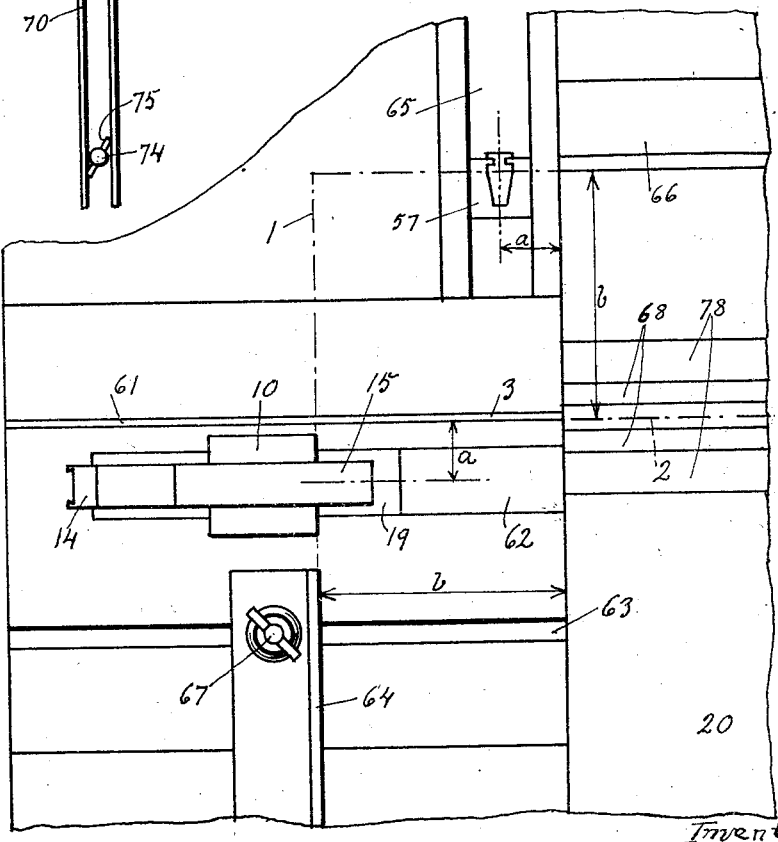
Fig.19.
Inventor:-
E. M. Holmer
by Langner, Parry, Card & Langner
Attys.

Patented Mar. 1, 1932

1,847,515

UNITED STATES PATENT OFFICE

ERIK MANNE HOLMER, OF GOTTENBORG, SWEDEN

MACHINE FOR MAKING BLANKS FOR CARDBOARD BOXES

Application filed July 1, 1930, Serial No. 465,216, and in Sweden January 14, 1930.

It is known to make boxes of cardboard or mill-board in the form of a prepared blank which can be quickly converted by the user into a box or carton. The edges of the blank are, for this purpose, fitted with clips which, when the sides are turned up, may easily be turned down over adjoining tucked in parts of the blank. In order to make the box more rigid, the clips are mounted within the edges of the blank and notches are cut out in the edge portion under the clips, similar notches being cut out in the edge at the points of the blank where the clips are to be turned down in a manner fully described with reference to the accompanying drawings.

Machines are already known for creasing the blank in order to facilitate the folding up of the sides of the box. Machines are also known by means of which slots are simultaneously cut in the blank to form the end flaps of the box. There are also known machines for the sole mounting of the clips on the edges of the blank. As far as I am aware, no machine has yet been built which in the same operation will slot, crease and notch the blank and in addition mount clips at its edges. A box blank of the kind shown in Fig. 1 for making a box of the kind shown in Fig. 2 of the accompanying drawings may by means of the improved machine forming the subject of the invention be made in four identical operations whereas with known machinery eight to twelve operations were required which rendered the cost of the boxes very high.

The invention relates to an improved machine for making cardboard box blanks having notches and clips, which is principally characterized by the provision of a punch for making a notch, said punch having a feeding passage for the feeding through of the clips.

One form of the invention is illustrated by way of example in the accompanying drawings.

Fig. 3 shows a section on line III—III of Fig. 4 of the parts of the machine which carry out the punching in the same operation as they apply a clip, the parts being shown in position ready for receiving a new blank.

Fig. 4 shows a vertical section on line IV—IV in Fig. 3, and

Fig. 5 the same parts of the machine as Fig. 3, seen from the right hand end.

Fig. 6 shows a detail of the bed-die for the punch,

Fig. 7 a separate clip in plan and

Fig. 8 the same clip in elevation.

Fig. 9 shows the same parts of the machine as Fig. 3, but seen from the side and in depressed position with a cardboard blank which has just been punched and provided with a clip.

Fig. 10 shows a piece of the blank with notch and clip in plan,

Fig. 11 shows on a larger scale in sectional elevation the parts in the position they assume immediately after the blank has been punched and provided with a clip.

Fig. 12 and Fig. 13 show the complete machine in elevation and side view respectively.

Fig. 14 shows the punch which makes the second notch in the blank, in the flap to which no clip is applied.

Fig. 15 shows a detail of the same punch and

Fig. 16 the punch in plan.

Fig. 17 shows a sectional elevation of the creasing device and

Fig. 18 a part of the same drawn to a larger scale and in another working position.

Fig. 19 is a top view of a part of the table showing the position of the creasing device and various register stops.

Figure 20:
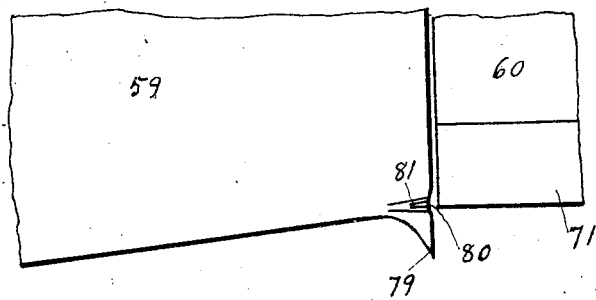

Fig. 20 a detail of the slotting cutter.

Figure 1:
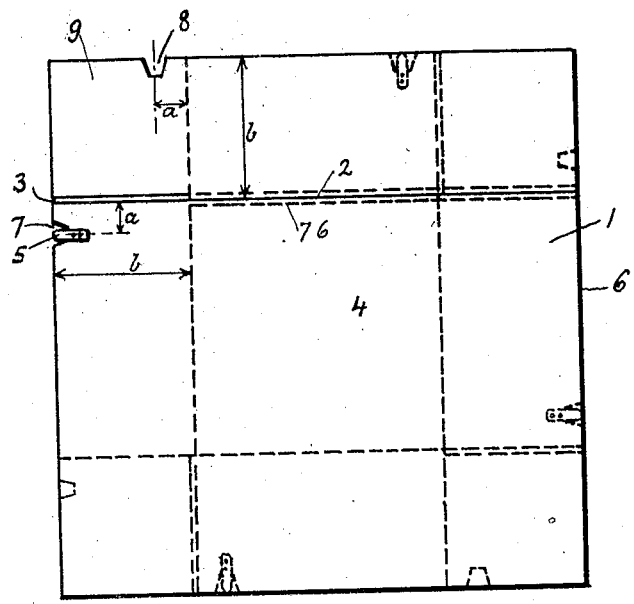
Fig. 1 shows a cardboard blank punched and provided with clips in the machine.
Figure 2:
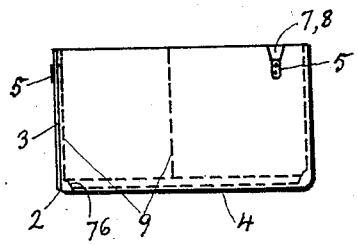
Fig. 2 shows a box erected from the blank ready for use.

Fig. 1 shows the blank to be produced by the machine. The creases 2 stamped in the rectangular cardboard blank 1 and the slots or cuts 3 made from each edge, are arranged as usual for facilitating the raising or turning up of the four box sides from the bottom or middle part 4. The clips 5 are also of the usual type, but they do not extend outside the edges 6, their outer ends stopping flush with the edges. A notch 7 is stamped out in the cardboard edge under the outer part of each clip 5 and an identical notch 8 is made in each end flap 9 at the point that will register with the notch 7, when the box sides are raised and the flaps 9 turned in to lie inside the adjoining box side, see Fig. 2. Thus the box will be made ready for use by raising the sides and turning in the flaps 9. The clips are then folded with the fingers over the side and flap edges just as usual with the exception only, that the clips in the blank construction shown will bind the edges together at the bottom of the notches 7 and 8. Thereby the considerable advantage is gained that the flap 9 and the box side fastened to it cannot become displaced within the clip, this being effectively prevented by the part of the clip which lies in the notches 7, 8 as will be seen in Fig. 2, where the notches 7, 8 lie exactly opposite each other and the clip 5 is of the same width as the notches.

In Fig. 1 only the two notches, the clip, the slot and the crease which are produced in the first operation of the machine are shown in full lines. Those produced in the following three operations are shown in dotted lines.

The parts of the machine which simultaneously punch the notch and fix the clip will first be described. These parts of the machine are shown in Figs. 3, 4, 5, 9 and 11. They comprise a tool carrying slide, movable up and down and a guide 10 for the same. The slide is composed of a number of rigidly connected parts 11, 12, 13, 14 and 15, of which part 11 is provided with the punching tool 16, part 12 slides between the shanks of the guide pillar 10 (see Fig. 4) parts 11 and 13 slide in grooves 17 at each end of the guide 10, part 14 guides the clips, and part 15 acts as a press bar for operation by the press beam of the machine, the return movement of the parts being effected by a return spring 18 arranged between 15 and 10. The guide 10 stands on a plate 19, which serves as a table for supporting the blank and as a bed-die as well and for this purpose is provided with a hole shaped to fit the punching tool 16.

The clips 22 are supplied in the form of a web wound on a roll 23 (see Figs. 12, 13). They are led in a groove in the slide part 14 and are pushed down and forward so that the first clip 5 comes in position below the slide part 11. In Fig. 3 the front wall of the groove is omitted in order to show the clip web better, but the rest of part 14 is shown in view and not in section. The band is intermittently fed forward by a finger 25, which is hinged to a lever 26 and is kept pressed upwards against the band by one or two springs 27 which may be fixed to the lever 26 and to a pair of arms 28 extending from the guide 10, between which arms the lever 26 is provided with cam-like extensions 29, which co-operate with the edges of a recess 30 in part 13, play being provided between the cam and the recess.

At the commencement of the operation the cardboard blank 1 is inserted on top of the plate 19 and below the slide part 11, (see Figs. 9 and 11), whereupon the press beam 44 of the machine descends and exerts a pressure downwards on the press bar 15, whereby the entire slide is moved down from the position shown in Fig. 3 to that shown in Fig. 9. By this movement the notch 7 (Figs. 1, 10) is stamped out of the cardboard blank and the clip 5 is immediately afterwards pressed into the cardboard with its points 24 (Figs. 8, 11). At the same time a knife 32 fastened to the plate 19 severs the clip 5 from the web 22, see Fig. 11. To withstand the pressure and wearing of the cutting action, part 11 is reinforced at the inner edge by a counter-knife 33, which is inserted into a groove cut out in the part 11. When the knife 32 cuts the web 22, the web end is pushed upwards a little and lifts a member 34 which slides in a recess 35 in the part 12 (Fig. 11). Member 34 is fastened to a rod 37 with removable head 36, which is controlled by a spiral spring 39 inserted in a recess 38. The spring presses against the member 34 at one end and at the other against the bottom of the recess 38. The head 36 may be sunk into a recess 40 in the part 12 so that it does not project when the slide is in its upper position, Fig. 3. When the slide descends the spring 18 is compressed. When the pressure from the press beam of the machine has ceased and the beam ascends the spring 18 moves the slide upwards. When the web leaves the knife 32, the spring 39 presses the member 34 back downwards and thereby repositions the end of the web so that it clears the knife 33 and can later be pushed forwards through the feed passage 41, which is made in the punching tool 16 for the passage of the web 22 therethrough. The web must therefore not be fed forward until the slide has moved a sufficient distance upwards and the punched blank has been removed. For this purpose the above mentioned play of the cam 29 in its recess 30 is provided.

Referring to Figs. 12 and 13, the table is carried by a frame 42. This frame carries also a press beam 44, movable in guides 43 and a driving shaft 45 with a pulley 46 and a coupling 47. The shaft 45 is journalled in bearings 48 and carries upon its ends cranks 49 the crank rods 50 of which are linked to rods 51 fixed to the beam 44 and guided by the guides 43. When the shaft 45 rotates, the beam 44 is moved up and down by the crank rods 50, and a press plate 52 attached to the beam presses the member 15 and the slide down. An angle-shaped member 55 fixed to the beam 44 carries a second punch 54, which punches the notch 8, Fig. 1, in the blank, which has no corresponding clip. This punch is shown on a larger scale in Figs. 14 to 16 and is provided with guide grooves 55 guided by portions 56 of a die 57 in its up and down movement in the die 57. The punch 54 carries a punching tool proper 58 which is tapered to one side, as shown in Fig. 15, so that the cardboard may not fasten against this side, when removed after punching. In order to speed up the operation, the cardboard piece must be removed after punching before the punching tool 58 has left its die. For this purpose a free space must be left above the tool 58.

The blank is completely prepared in four operations by each of which the following work is performed: punching of the upper notch 7 in the left hand edge (see Fig. 1) and inserting the clip 5 at the same place, punching of the notch 8 in the upper edge, cutting out of the slot 3 and pressing the crease 2. In the preceding description the two punchings and the mounting of the clip have been dealt with. The slotting and crease pressing will now be described.

On the press beam 44, Fig. 12, both a knife 59 and a crease pressing plate 60 are carried, which follow the up and down movement of the beam. The knife 59 cuts out the slot 3 on moving down into a slot 61 in the table 20, Fig. 19. Parallel to this slot 61, two further slots are arranged: a slot 62 in which the parts 10, 15, 19 are mounted, and another slot 63 containing a stop 64 against which the cardboard 1 is held during the operation. In the same table 20 at right angles to the slot just mentioned, there are two more slots: a slot 65 into which the punch 57, 58 is inserted, and a second slot, not shown in the drawings, for a second register stop 66 for the cardboard 1. These register stops 64, 66 are fixed by wing nuts 67 in such a manner that the distances *b* are the same (see also Fig. 1), these distances representing the height of the box. The distances *a*, Figs. 1 and 19, are always the same and identical for all boxes and lids. These dimensions may be made changeable by making the parts of the table 20, in which the slots 62 and 65 are applied, adjustable. The means for fixing the punches 10 and 57 and the stop 66 in their desired position on the table, are not shown in the drawings and may be of any known design for a similar purpose.

To effect the creasing, the crease pressing plate 60 attached to the press beam 44 moves down on to a pair of crease pressing bars 68 rocking on a support 69 in the table 20, Figs. 17, 18. The bars 68 are provided with downwardly extending arms 70. To the lower part of the plate 60, a horizontally extending case 71 is attached which is provided with flaps 72 normally held in the horizontal position (as shown in Fig. 17) by springs 82, Fig. 18. These springs may be mounted upon pins 73 fixed to the flaps 72. During the creasing operation, see Fig. 18, the flaps 72 are pressed upwards by the crease pressing bars 68 against the action of the springs. When the cardboard 1 is acted upon by the plate 60 along the crease line 2, the action of the bars 68 upon the flaps 72 during the continued downward movement of the plate 60 turns the flaps 72 into slanting positions and at the same time the tops of the bars 68 are moved towards each other thereby moving the cardboard portions adjacent to the crease and forming a swelling 76, see also Figs. 1 and 2, which facilitates subsequent folding of the blank along the crease. On the upstroke of the press beam the blank straightens but the crease made by the plate 60 remains. The swelling 76 on the under side also remains, its width depending on the space between the bars 68, which space is adjustable by means of a rotatable member 74 carrying pins 75 adapted to move apart the arms 70. These arms 70 are not limited in their movement outwards. The pins 73 move in slots 77 in the upper side of the case 71. The table is provided with grooves 78 below the sides of the case 71 to allow of a small and temporary bending down of the cardboard at the sides of the crease.

The knife 59 is provided with a claw 79, Fig. 20, which is known per se, and has a notch 80 and a tapering portion 81 above said claw and level with the lower edge of the crease pressing plate 60. This construction is used in order that the cardboard may not crack inwards along the crease 2. The cardboard shrinks a little during the crease pressing, as mentioned above, and this would cause the cardboard to crack if the knife 59 were not formed as described.

In order to facilitate still further the work, the driving coupling 47, Fig. 12, is so arranged that it does not disengage, before the press beam reaches its highest position. This arrangement is not shown here, as it is no part of the present invention. The crank rods 50 are adjustable as regards their length to suit different thicknesses of cardboard. The length of the crank rods determines how near to the table 20 the crease pressing plate 60 with accessories will be brought.

The pressing plate 52 is suitably made yielding to compensate for differences in the cardboard thickness. The punch 11 must not be moved down any further than required for fixing the clip rigidly to the cardboard.

I claim:—

1. In a machine for making blanks for cardboard boxes, a punching tool for making notches in the edges of the blank and a transverse passage in said tool for feeding through clips to be attached to the blank.

2. In a machine for making blanks for cardboard boxes, a punching tool for making notches in the edges of the blank, a transverse passage in said tool for feeding through clips to be attached to the blank and said tool being fixed to a pressing slide, the under side of which is flat for pressing the clip against the blank.

3. In a machine for making blanks for cardboard boxes, a punching tool for making notches in the edges of the blank, a transverse passage in said tool for feeding through clips to be attached to the blank, said clips being in the form of a web and a knife combined with said punching tool for severing the attached clip from the web.

4. In a tool comprising a fixed guide a slide and a bed plate with die, a punching tool on the lower flat end of the slide to co-operate with the die, a transverse passage in said punching tool, a groove in the lower side of the slide to accommodate a web of clips to slide therein, a feeding finger hinged to the guide by means of a lever and engaging the web from below, said lever provided with cam surfaces to engage a recess in the slide with play.

5. In a tool comprising a fixed guide a slide and a bed plate with die, a punching tool on the lower flat end of the slide to co-operate with the die, a transverse passage in said punching tool, a groove in the lower side of the slide to accommodate a web of clips to slide therein, a feeding finger hinged to the guide by means of a lever and engaging the web from below, said lever provided with cam surfaces to engage a recess in the slide with play, and a knife fixed to the bed plate to sever a clip from the web when the slide is lowered down to the bed plate.

6. In a tool comprising a fixed guide a slide and a bed plate with die, a punching tool on the lower flat end of the slide to co-operate with the die, a transverse passage in said punching tool, a groove in the lower side of the slide to accommodate a web of clips to slide therein, a feeding finger hinged to the guide by means of a lever and engaging the web from below, said lever provided with cam surfaces to engage a recess in the slide with play, a knife fixed to the bed plate to sever a clip from the web when the slide is lowered down to the bed plate and a spring controlled member in the slide above the web to be pressed upwards by the knife and bring back the web end upon the return upwards of the slide into alignment with the transverse passage of the clips in the punching tool.

7. In a machine for making blanks for cardboard boxes, a punching tool making notches in the edges of the blank and a transverse passage in said tool for feeding through clips to be attached to the blank and an additional punch for simultaneous making of another notch without clip.

8. In a machine for making blanks for cardboard boxes, a punching tool for making notches in the edges of the blank, a transverse passage in said tool for feeding through clips to be attached to the blank, said clips being in the form of a web and a knife combined with said punching tool for severing the attached clip from the web and an additional punch for simultaneous making of another notch without clip.

9. In a machine for making blanks for cardboard boxes, a punching tool making notches in the edges of the blank and a transverse passage in said tool feeding through clips to be attached to the blank and an additional punch for simultaneous making of another notch without clip, a press beam actuating the punching tools carrying a crease pressing plate and crease pressing bars in the machine table co-operating with said plate.

10. In a machine for making blanks for cardboard boxes, a punching tool for making notches in the edges of the blank, a transverse passage in said tool for feeding through clips to be attached to the blank, said clips being in the form of a web and a knife combined with said punching tool for severing the attached clip from the web and an additional punch for simultaneous making of another notch without clip, a press beam actuating the punching tools carrying a crease pressing plate and crease pressing bars in the machine table co-operating with said plate.

11. In a machine for making blanks for cardboard boxes, a punching tool making notches in the edges of the blank and a transverse passage in said tool feeding through clips to be attached to the blank and an additional punch for simultaneous making of another notch without clip, a press beam actuating the punching tools carrying a crease pressing plate and crease pressing bars in the machine table co-operating with said plate and a slot cutting knife attached to the press beam in line with said crease pressing plate at one end thereof, said knife being provided with a downwardly extending point adjacent to the crease pressing plate, with a notch above said point level with the under edge of the crease pressing plate and with a thinner portion in horizontal direction from said notch.

12. In a machine for making blanks for cardboard boxes, a punching tool for making notches in the edges of the blank, a transverse passage in said tool for feeding through clips to be attached to the blank, said clips being in the form of a web and a knife combined with said punching tool for severing the attached clip from the web and an additional punch for simultaneous making of another notch without clip, a press beam actuating the punching tools carrying a crease pressing plate and crease pressing bars in the machine table co-operating with said plate and a slot cutting knife attached to the press beam in line with said crease pressing plate at one end thereof, said knife being provided with a downwardly extending point adjacent to the crease pressing plate, with a notch above said point level with the under edge of the crease pressing plate and with a thinner portion in horizontal direction from said notch.

13. The combination, in a machine, of a vertically reciprocating press beam with a horizontal table, said press beam carrying a slot cutting knife, a crease pressing plate, a punch and a press plate, and said table carrying therewith co-operating tools, a slot in the table for the knife, crease pressing counter bars, a punch die and a slide, said slide carrying a punching tool on its lower flat side, and said punching tool having a transverse passage for a web of clips to be fed therethrough.

In testimony whereof I have signed my name to this specification.

ERIK MANNE HOLMER.